(12) United States Patent
Shin et al.

(10) Patent No.: US 9,658,455 B2
(45) Date of Patent: May 23, 2017

(54) OPTICAL DEVICE HAVING A DIFFRACTION REGION

(71) Applicant: LG ELECTRONICS INC., Seoul (KR)

(72) Inventors: Sungchul Shin, Seoul (KR); Seunggyu Lee, Seoul (KR)

(73) Assignee: LG ELECTRONICS INC., Seoul (KR)

(*) Notice: Subject to any disclaimer, the term of this patent is extended or adjusted under 35 U.S.C. 154(b) by 0 days.

(21) Appl. No.: 14/436,800

(22) PCT Filed: Sep. 23, 2013

(86) PCT No.: PCT/KR2013/008471
§ 371 (c)(1),
(2) Date: Apr. 17, 2015

(87) PCT Pub. No.: WO2014/061920
PCT Pub. Date: Apr. 24, 2014

(65) Prior Publication Data
US 2015/0293357 A1 Oct. 15, 2015

(30) Foreign Application Priority Data
Oct. 18, 2012 (KR) .................. 10-2012-0116220

(51) Int. Cl.
*G02B 27/02* (2006.01)
*G02B 27/01* (2006.01)
*G02B 5/18* (2006.01)

(52) U.S. Cl.
CPC ....... *G02B 27/0172* (2013.01); *G02B 5/1861* (2013.01); *G02B 27/02* (2013.01);
(Continued)

(58) Field of Classification Search
CPC .... G02B 2027/0174; G02B 2027/0125; G02B 27/02; G02B 27/0172; G02B 5/1861;
(Continued)

(56) References Cited

U.S. PATENT DOCUMENTS 5,742,262 A 4/1998 Tabata et al.
5,757,544 A 5/1998 Tabata et al.
(Continued)

FOREIGN PATENT DOCUMENTS

KR 10-0206688 B1 7/1999

*Primary Examiner* — Bumsuk Won
*Assistant Examiner* — Henry Duong
(74) *Attorney, Agent, or Firm* — Birch, Stewart, Kolasch & Birch, LLP

(57) ABSTRACT

An optical device that is capable of producing an image in the air includes a substrate having a reflective diffraction region formed into a net structure, and a light radiation unit which radiates a light beam onto one surface of the substrate. The diffraction region is capable of collecting light beams that are diffracted in the upper space of one surface of the substrate by diffracting the light beam which is incident on one surface of the substrate. Here, the light radiation unit may have a display source that generates the light beams which form the image, and a lens portion that radiates the generated light beams onto the substrate.

20 Claims, 10 Drawing Sheets

(52) U.S. Cl.
CPC ............... *G02B 2027/0125* (2013.01); *G02B 2027/0174* (2013.01); *G02B 2027/0178* (2013.01)

(58) Field of Classification Search
CPC .......... G02B 2027/0178; G02B 5/1842; G02B 5/1828; B42D 15/105; B42D 2035/22; G03H 1/30
USPC ........................................................ 359/567
See application file for complete search history.

(56) References Cited

U.S. PATENT DOCUMENTS

| | | | |
|---|---|---|---|
| 5,917,459 A | 6/1999 | Son et al. | |
| 7,271,957 B2 * | 9/2007 | Yabuhara | G02B 5/0252 359/571 |
| 7,656,585 B1 | 2/2010 | Powell et al. | |
| 2004/0257663 A1 * | 12/2004 | Edelmann | G02B 5/1814 359/631 |
| 2007/0019264 A1 * | 1/2007 | Tanijiri | G02B 5/32 359/15 |
| 2010/0157433 A1 * | 6/2010 | Mukawa | G03B 21/26 359/633 |
| 2011/0242635 A1 | 10/2011 | Oka | |
| 2015/0070478 A1 * | 3/2015 | Wei | H04N 13/0409 348/60 |

\* cited by examiner

FOV

OPTICAL DEVICE HAVING A DIFFRACTION REGION

TECHNICAL FIELD

The present invention relates to an optical device, and, more particularly, to an optical device which is capable of producing an image in the air.

BACKGROUND ART

Wearable displays producing an image in the air are generally divided into two types. That is, there are a helmet-type wearable display worn on a user's head and a glasses-type wearable display. A helmet-type wearable display has a structure in which an optical lens system has an increased volume so as to produce a large image through an expanded field of view (FOV) and is mounted on a user's head, and is thus referred to as a head mounted display (HMD). Therefore, the helmet-type wearable display is used in professional fields requiring a restricted space with little motion, such as military training (cyber flight training) and cyber games.

On the other hand, a glasses-type wearable display, as exemplarily shown in FIGS. 1(a)-1(c) has a lightweight and small-sized structure that is mounted on user's nose and ears like the structure of glasses and is easily used while in motion. Glasses-type wearable displays are divided into three structures.

First, a direct view structure 110 as shown in FIG. 1(a), in which panel and a lens are fixed in front of the eyes, is most classic and basic in design of a virtual image optical system and is formed in a see-closed type in which a user may see an external view. Therefore, the direct view structure 110 needs to recognize an external view in a moving space and is thus disadvantageous.

Second, in order to solve the disadvantage of the direct view structure 110, a top-fixed reflection structure 120 as shown in FIG. 1(b), a top view, in which a panel is fixed at the top and a user may see an external view using a partially reflective surface, is provided. However, since the panel and an optical system group are generally fixed in front of the eyes, the top-fixed reflection structure 120 is difficult to have a thin thickness as in a general glasses structure and a light weight.

Third, a side-fixed light guide structure 130 as shown in FIG. 1(c), a side view, in which a panel and an optical lens group are moved from the front to side frames at the side of eyes and is similar to a glasses lens using a light guide, is provided.

Side-fixed light guide structures are divided into a PBS type 210 and a prism type 220 so as to transmit beams to a pupil through internal reflection of a planar light guide, as exemplarily shown in FIGS. 2(a) and 2(b). Since special partial coating of several tens of layers is performed on respective PBS plane segments and then the segments are bonded so as to uniformly emit beams from respective mirrors and the top-fixed reflection structure 210 is formed of a restricted material, such as glass, the top-fixed reflection structure 210 is difficult to mass produce using a mold structure. On the other hand, the prism type structure 220 may be manufactured using a mold structure and be easily formed of plastic. However, a lens group is disposed distant from the eyes through total internal reflection and thus the two planar light guide types are limited in extension of an FOV and a PBS or prism pattern is virtually visible.

Further, beams are reflected within the effective range of partial PBS mirrors or a prism mirror changing a path to guide the beams to pupils through total internal reflection of a planar light guide and, thus, the conventional methods are limited in the FOV determining the size of an image. As exemplarily shown in FIGS. 3(a) and 3(b), in order to form a range in which beams do not overlap to perform internal reflection, an effective segment partial PBS mirror range 310 or a prism mirror range 320 is restricted in connection with the thickness of the planar light guide. Particularly, since intervals between eyes differ from one person to another and pupils move, an eye motion box (EMB) range to maintain performance of a desired image is considered even in such a change and, thus, there is a severe restriction on increase in the FOV through internal reflection. Moreover, a visual pattern is visible and, thus, the segment partial PBS mirror structure or the prism mirror structure needs to be considered in design.

SUMMARY OF THE INVENTION

An object of the present invention is to provide an optical device which has a thin glasses structure and a broad Field Of View (FOV), causes a visual pattern not to be visible, and enables a wearable display.

In one embodiment of the present invention, an optical device includes a substrate including a reflective diffraction region formed in a net structure on one surface thereof and a light radiation unit configured to radiate light beams to the surface of the substrate, wherein the diffraction region is configured to diffract light beams incident upon the surface of the substrate and to collect the diffracted light beams within a space above the surface of the substrate.

The light radiation unit may include a display source configured to generate light beams to produce an image, and a lens unit configured to radiate the generated light beams to the substrate.

At least a part of the substrate may be transparent so as to transmit light incident from an external view.

The substrate may be opaque so as to block transmission of light.

The diffraction region may be formed by coating the surface of the substrate or is a coating film.

A coating material of the diffraction region may be a material which may reflect light.

According to circumstance, the diffraction region may be formed by partial mirror coating or coating with a material reflecting a specific wavelength band.

Further, in the diffraction region, lattice-type net meshes may be uniformly formed. The size of the net meshes of the diffraction region may be determined based on at least one of a distance between the substrate and user's eyes, the size of user's pupils and the wavelength band of a light source.

The diffraction region may include coating areas which are coated and non-coating areas which are not coated.

The meshes of the diffraction region may correspond to the non-coating areas.

A periodic pattern having an angle of reflection in a Holographic Optical Element (HOE) type or a Diffractive Optical Element (DOE) type may be formed in the coating areas.

In the overall area of the diffraction region, the ratio of the total area of the coating areas to the total area of the non-coating areas may be 1:1.

According to circumstance, in the overall area of the diffraction region, the total area of the coating areas may be greater than the total area of the non-coating areas.

The substrate may include a first surface disposed opposite the user's eyes and a second surface opposite to the first surface, the diffraction region may be formed on the first surface of the substrate, and the light beams may be radiated from the outside of the substrate to the first surface of the substrate.

Further, the substrate may include a first surface disposed opposite the user's eyes and a second surface opposite to the first surface, the diffraction region may be formed on the second surface of the substrate, the light beams may be radiated from the inside of the substrate to the second surface of the substrate.

The substrate may have a planar surface or a curved surface having curvature.

If the substrate has a curved surface having curvature, the surface of the substrate disposed closer to the user's eyes may be concave.

The substrate may include at least one of a glass substrate, a plastic substrate and a metal substrate.

The optical device may have an eyeglasses frame structure.

In accordance with an optical device in accordance with the present invention, light emitted from a display source is collected by a diffraction region having a fine structure formed on a substrate and, thus, a wearable display having a thin glasses structure, a broad Field Of View (FOV), causing a visual pattern not to be visible and eliminating visual unpleasantness may be manufactured.

DETAILED DESCRIPTION OF THE EMBODIMENTS

Now, preferred embodiments of the present invention will be described in detail with reference to the annexed drawings. Those skilled in the art will appreciate that various modifications, additions, and substitutions to the specific elements are possible, without departing from the scope and spirit of the invention as disclosed in the accompanying claims.

Also, terms used in the following description are terms widely used at present taking into consideration the functions obtained in accordance with the present invention, and the definitions of these terms may be changed in accordance with the intention of a worker in the art, a usual practice, or advent of new technology. Further, in a specific case, an applicant may define terms and, in this case, the definitions of these terms should be stated in the description. Therefore, the terms used in the following description should be defined based on the meaning of the terms and the whole content of this specification.

Figure 1C:
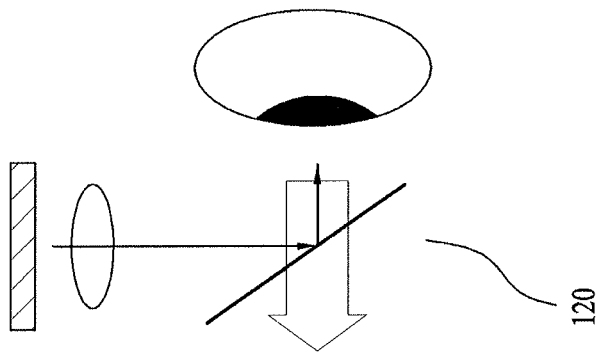
FIGS. 1(a)-1(c) are views illustrating examples of glasses-type wearable displays.
Figure 1B:
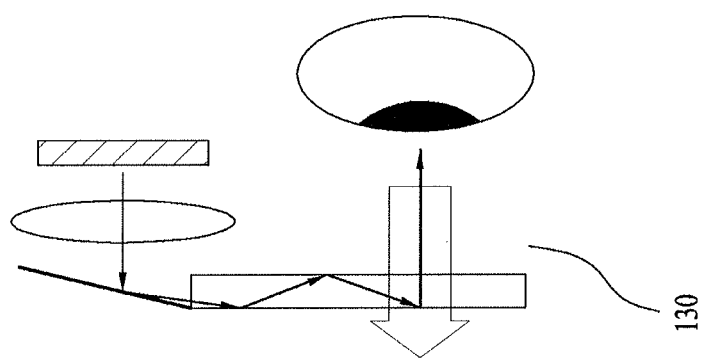
Figure 1A:
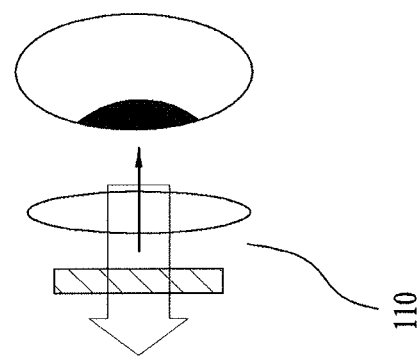
Figure 2A:
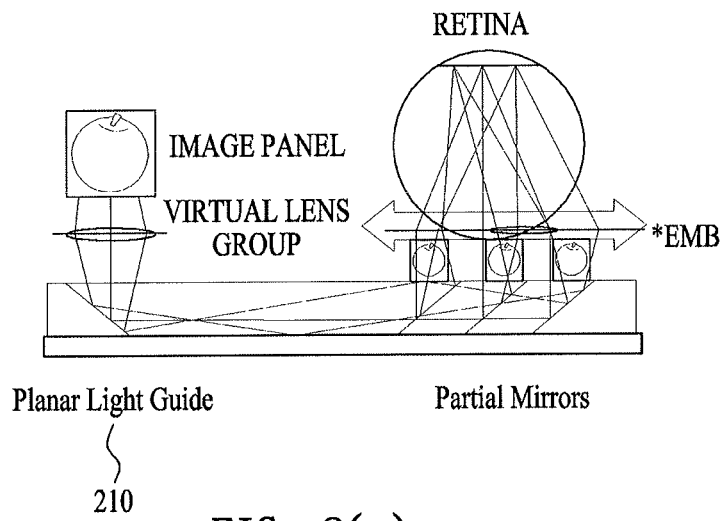
FIGS. 2(a) and 2(b) are views illustrating examples of planar light guide-type wearable displays.
Figure 2B:
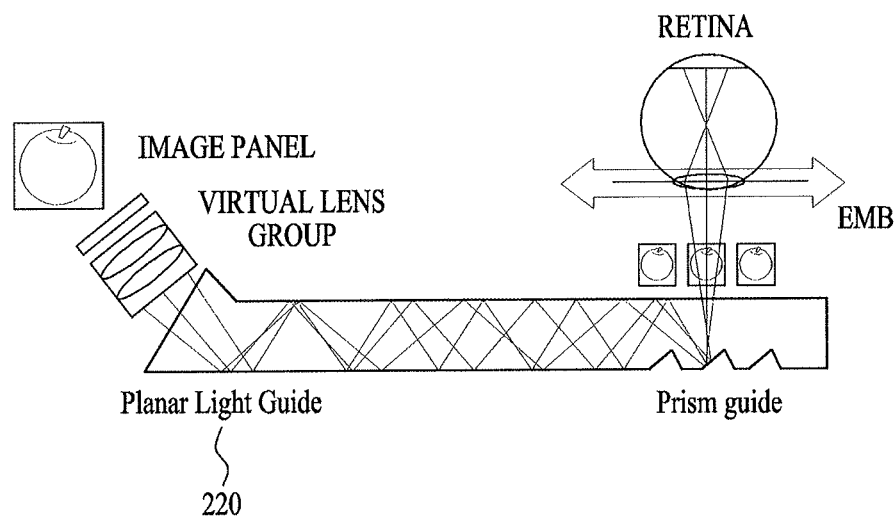
Figure 3A:
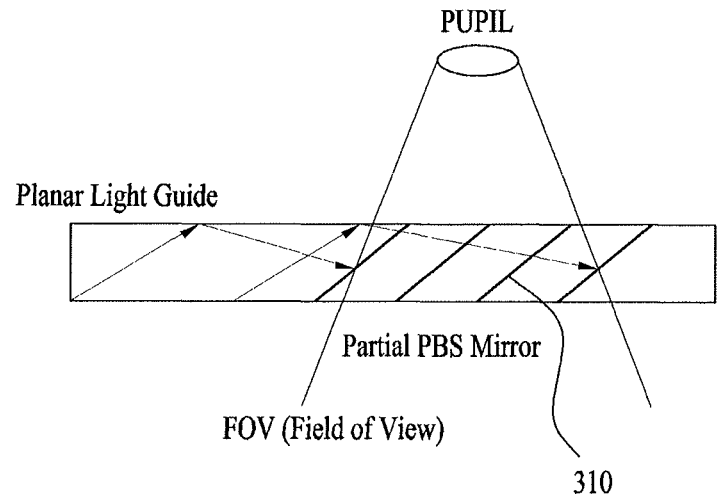
FIGS. 3(a) and 3(b) are views illustrating Field Of Views (FOVs) of planar light guide-type wearable displays.
Figure 3B:
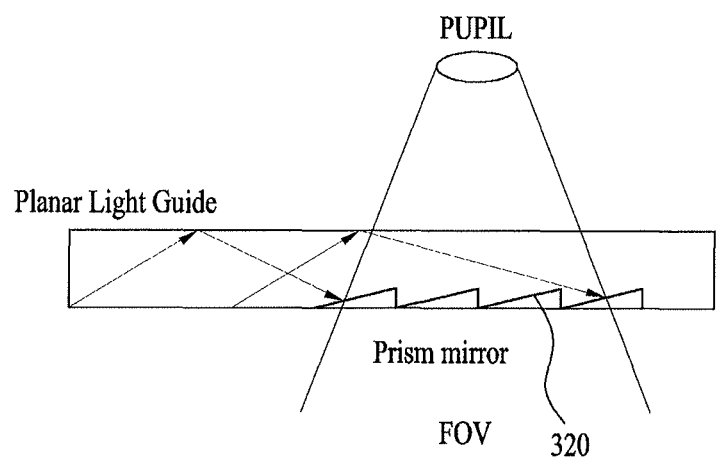
Figure 4:
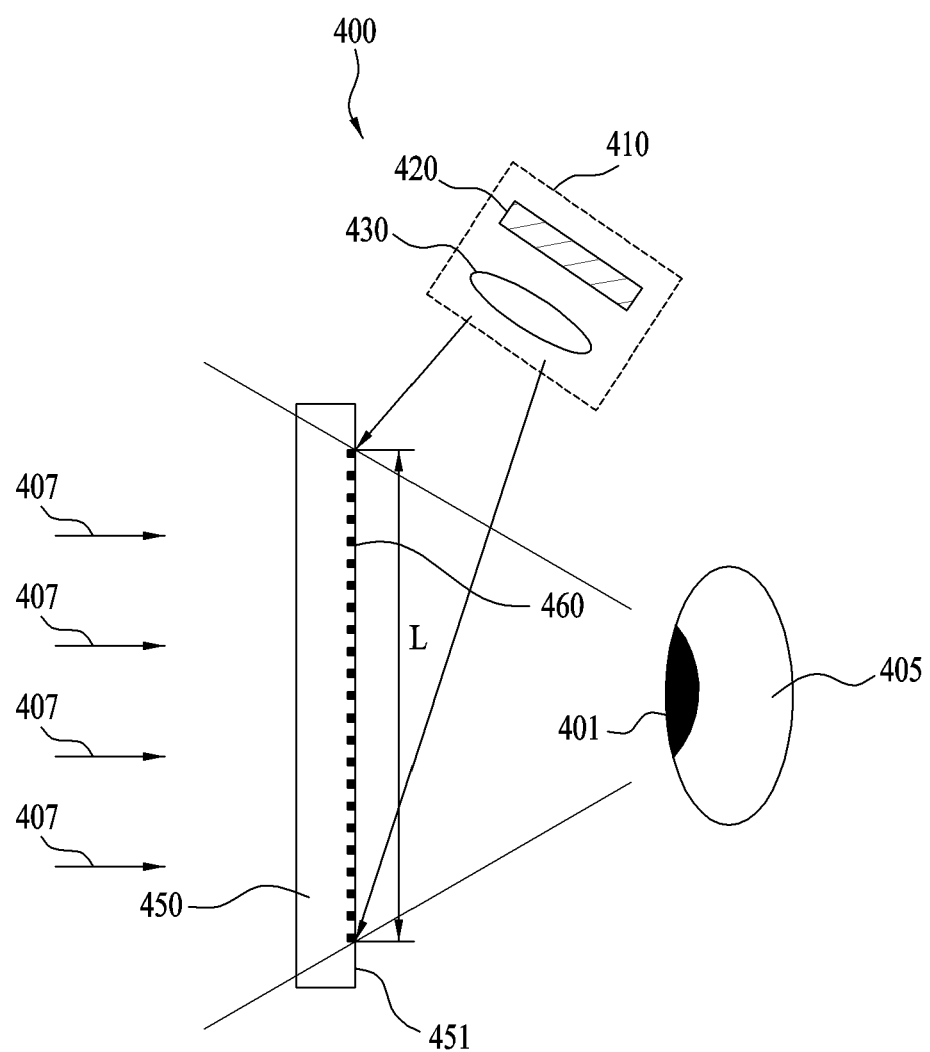
FIG. 4 is a view illustrating the structure of an optical device in accordance with one embodiment of the present invention.

FIG. 4 is a view illustrating the structure of an optical device in accordance with one embodiment of the present invention.

With reference to FIG. 4, an optical device 400 in accordance with the present invention may include a light radiation unit 410 and a substrate 450.

The light radiation unit 410 radiates light beams to the substrate 450. The light beams may be light beams to produce a 2D image or a 3D image. The 3D image may include at least one of a stereo image and a multi-view image.

The light radiation unit 410 may radiate light beams to one surface 451 of the substrate 450. In some embodiments, the light radiation unit 410 may radiate light beams to a diffraction region 460 included in the surface 451. Further, the light radiation unit 410 may radiate light beams within the range of the diffraction region 460.

The light radiation unit 410 may include a display source 420 and a lens unit 430. The display source 420 generates light beams to display an image.

The lens unit 430 causes light beams generated by the display source 420 to be incident upon the substrate 450. In some embodiments, the lens unit 430 may collect light beams within the range of the diffraction region 460 so that the light beams may be radiated to the surface 451. That is, the light beams may be incident upon the surface 451 within the range of the diffraction region 460.

The lens unit 430 may include at least one lens, and the lens may include at least one of a glass lens, a plastic lens and a liquid crystal lens. Further, the lens unit 430 may be located between the display source 420 and the substrate 450.

The substrate 450 includes the reflective diffraction region 460 on one surface 451 thereof. In some embodiments, at least a part of the substrate 450 may be transparent so as to transmit light 407 incident from an external view. In some embodiments, the substrate 450 may be opaque so as to block transmission of the light 407 incident from the external view.

The substrate 450 may have a planar surface or a surface having curvature. Further, the substrate 450 may include at least one of a glass substrate, a plastic substrate and a metal substrate.

The diffraction region 460 diffracts light beams incident upon the surface 451 and collects the diffracted light beams in a space 401 above the surface 451. User's pupils 405 may be located in the space 401.

The range L of the diffraction region 460 may be determined based on a Field Of View (FOV). The lens unit 430 may adjust the path of light beams so that the light beams are restricted within the range L of the diffraction region 460.

According to circumstance, the area of the diffraction region 460 may vary according to a distance between the diffraction region 460 and the user's pupils 405.

For example, the area of the diffraction region 460 may increase, as the distance between the diffraction region 460 and the user's pupils 405 increases.

The diffraction region 460 may be formed by coating the surface 451. Here, a coating material of the diffraction region 460 may be a material which may reflect light. Further, the diffraction region 460 may be formed by partial mirror coating or coating with a material reflecting a specific wavelength band.

The diffraction region 460 may be a coating film. That is, the diffraction region 460 may be formed by attaching a coating film to the surface 451.

The diffraction region 460 may include coating areas which are coated, and non-coating areas which are not coated. A periodic pattern having an angle of reflection in a Holographic Optical Element (HOE) type or a Diffractive Optical Element (DOE) type may be formed in the coating areas.

Here, the coating area of the diffraction region 460 is a non-transmissive area which does not transmit light and the non-coating area of the diffraction region 460 is a transmissive area which transmits light.

Therefore, in the overall area of the diffraction region 460, the ratio of the total area of the coating areas to the total area of the non-coating areas may be 1:1.

According to circumstance, in the overall area of the diffraction region 460, the total area of the coating areas may be greater than the total area of the non-coating areas.

Further, in the diffraction region 460, the coating areas and the non-coating areas may be regularly disposed.

However, according to circumstance, in the diffraction region 460, the coating areas and the non-coating areas may be irregularly disposed.

The substrate 450 includes a first surface disposed opposite the user's pupils 405 (i.e. relatively closer to the user's pupils 405) and a second surface opposite to the first surface (i.e. relatively farther from the user's pupils 405). The diffraction region 460 may be formed on the first surface of the substrate 450 and light beams may be radiated from the outside to the first surface of the substrate 450.

Here, the substrate may have a planar surface or a curved surface having curvature.

Here, if the substrate has a curved surface, one surface of the substrate disposed opposite the user's eyes may be concave.

A wearable display device in accordance with the present invention may include the display source 420, the lens unit 430 and the substrate 450.

Figure 5:
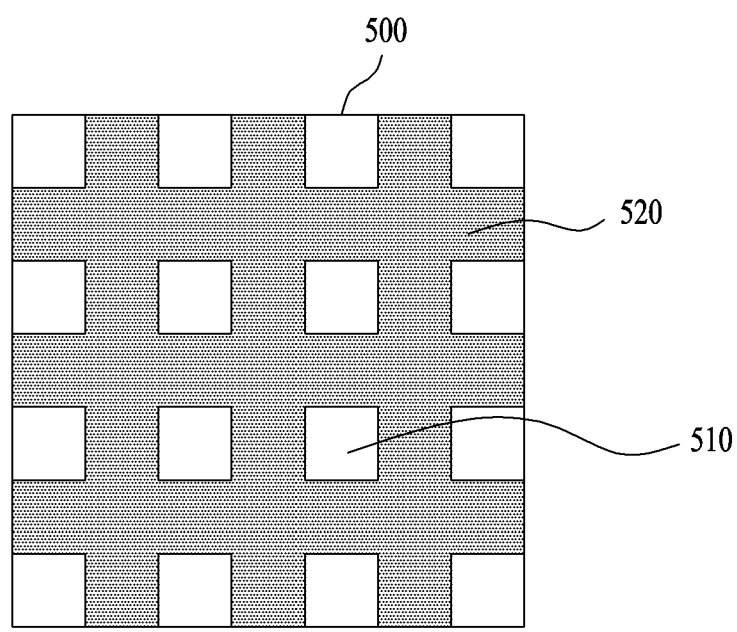
FIG. 5 is a view illustrating a diffraction region of an optical device in accordance with one embodiment of the present invention.

FIG. 5 is a view illustrating a diffraction region of an optical device in accordance with one embodiment of the present invention.

With reference to FIG. 5, the diffraction region 460 shown in FIG. 4 may be a diffraction region 500 formed in a web structure. The diffraction region 500 may include lattice-type meshes 510 which are uniformly formed. The meshes 510 of the diffraction region 500 may correspond to non-coating areas and a web 520 of the diffraction region 500 may correspond to coating areas. That is, the diffraction region 500 includes the non-coating areas 510 which are not coated and the coating areas 520 which are coated.

The size of the meshes 510 may be determined based on at least one of the distance between the substrate 450 and the user's pupils 405, the size of pupils and the wavelength band of a light source.

Here, the web 520 of the diffraction region 500 corresponds to non-transmissive areas which do not transmit light and the meshes 510 of the diffraction region 500 correspond to transmissive areas which transmit light.

Therefore, in the overall area of the diffraction region 500, the total area of the web 520 may be greater than the total area of the meshes 510.

Further, in the diffraction region 500, a plurality of meshes 510 may be regularly disposed.

Therefore, the distances between the neighboring meshes 510 may be the same.

Figure 6:
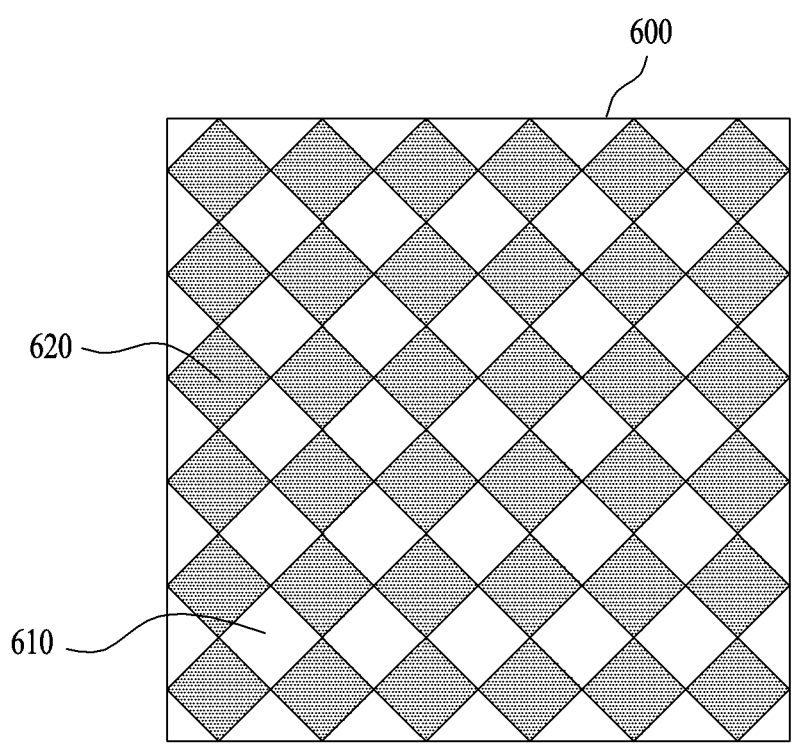
FIG. 6 is a view illustrating a diffraction region of an optical device in accordance with another embodiment of the present invention.

FIG. 6 is a view illustrating a diffraction region of an optical device in accordance with another embodiment of the present invention.

With reference to FIG. 6, the diffraction region 460 shown in FIG. 4 may be a diffraction region 600 formed in a diamond pattern structure. The diffraction region 600 may include diamond lattices 610 corresponding to non-coating areas and diamond lattices 620 corresponding to coating areas, which are uniformly disposed. That is, the diffraction region 600 includes the non-coating areas 610 which are not coated and the coating areas 620 which are coated.

The size of the diamond lattices 610 may be determined based on at least one of the distance between the substrate 450 and the user's pupils 405, the size of pupils and the wavelength band of a light source.

Here, the diamond lattices 620 of the diffraction region 600 correspond to non-transmissive areas which do not transmit light and the non-coating areas 610 of the diffraction region 600 correspond to transmissive areas which transmit light.

Therefore, in the overall area of the diffraction region 600, the ratio of the total area of the diamond lattices 620 to the total area of the non-coating areas 610 may be 1:1.

Further, in the diffraction region 600, the non-coating areas 610 may be regularly disposed.

Therefore, the distances between the neighboring non-coating areas 610 may be the same.

Figure 7:
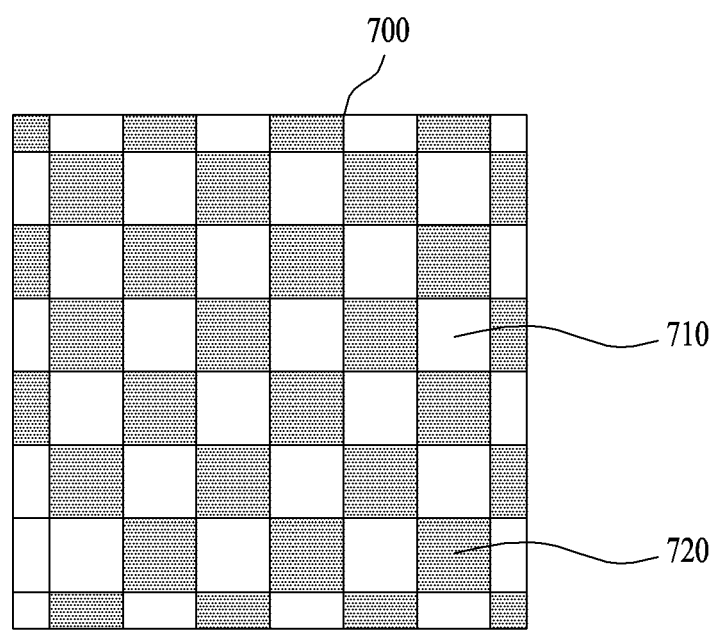
FIG. 7 is a view illustrating a diffraction region of an optical device in accordance with another embodiment of the present invention.

FIG. 7 is a view illustrating a diffraction region of an optical device in accordance with another embodiment of the present invention.

With reference to FIG. 7, the diffraction region 460 shown in FIG. 4 may be a diffraction region 700 formed in a chessboard structure. The diffraction region 700 may include lattices 710 corresponding to non-coating areas and lattices 720 corresponding to coating areas, which are uniformly formed. That is, the diffraction region 700 includes the non-coating areas 710 which are not coated, and the coating areas 720 which are coated.

The size of the lattices 710 may be determined based on at least one of the distance between the substrate 450 and the user's pupils 405, the size of pupils and the wavelength band of a light source.

Here, the coating areas 720 of the diffraction region 700 correspond to non-transmissive areas which do not transmit light and the non-coating areas 710 of the diffraction region 700 correspond to transmissive areas which transmit light.

Therefore, in the overall area of the diffraction region 700, the ratio of the total area of the coating areas 720 to the total area of the non-coating areas 710 may be 1:1.

Further, in the diffraction region 700, the non-coating areas 710 may be regularly disposed.

Therefore, the distances between the neighboring non-coating areas 710 may be the same.

Figure 8:
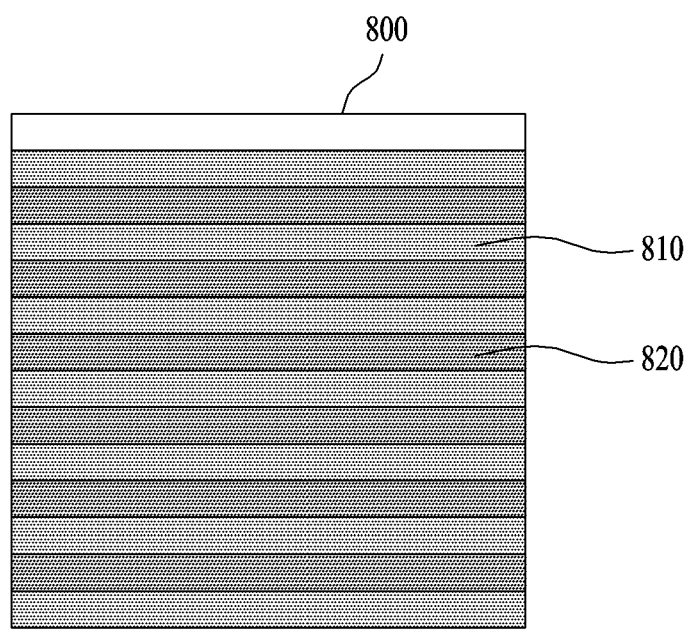
FIG. 8 is a view illustrating a diffraction region of an optical device in accordance with another embodiment of the present invention.

FIG. 8 is a view illustrating a diffraction region of an optical device in accordance with another embodiment of the present invention.

With reference to FIG. 8, the diffraction region 460 shown in FIG. 4 may be a diffraction region 800 formed in a stripe pattern structure. The diffraction region 800 may include stripes 810 corresponding to non-coating areas and lattices 820 corresponding to coating areas, which are uniformly formed. That is, the diffraction region 800 includes the non-coating areas 810 which are not coated, and the coating areas 820 which are coated.

The interval between the stripes 810 may be determined based on at least one of the distance between the substrate 450 and the user's pupils 405, the size of pupils and the wavelength band of a light source.

Here, the coating areas 820 of the diffraction region 800 correspond to non-transmissive areas which do not transmit light and the non-coating areas 810 of the diffraction region 800 correspond to transmissive areas which transmit light.

Therefore, in the overall area of the diffraction region 800, the ratio of the total area of the coating areas 820 to the total area of the non-coating areas 810 may be 1:1.

Further, in the diffraction region 800, the non-coating areas 810 may be regularly disposed.

Therefore, the distances between the neighboring non-coating areas 810 may be the same.

Consequently, a reflective diffraction region may be provided in a net structure as the web structure of FIG. 5, the diamond pattern structure of FIG. 6, the chessboard structure of FIG. 7, or the stripe pattern structure of FIG. 8.

Figure 9:
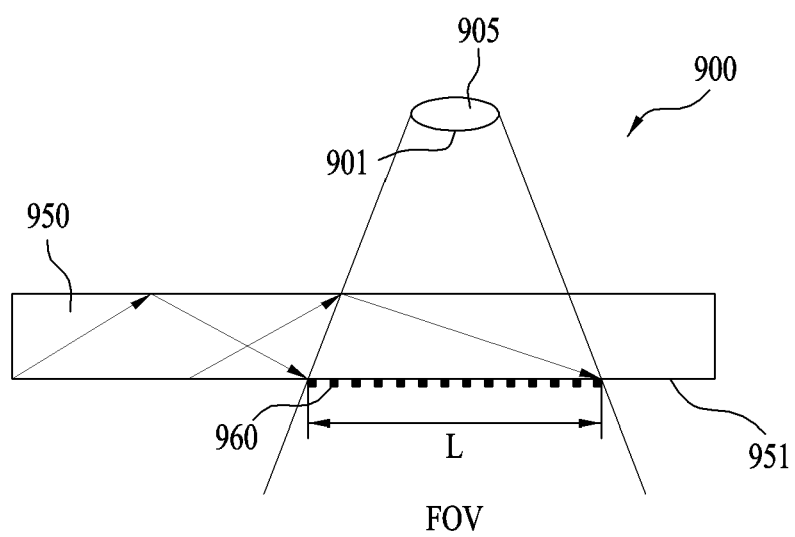
FIG. 9 is a view illustrating the structure of an optical device in accordance with another embodiment of the present invention.

FIG. 9 is a view illustrating the structure of an optical device in accordance with another embodiment of the present invention.

With reference FIG. 9, in an optical device 900, the substrate 450 of the optical device 400 shown in FIG. 400 is replaced with a planar light guide 950. The optical device 900 may include a light radiation unit 410 and the planar light guide 950. The light radiation unit 410 radiates light beams to the planar light guide 950.

The planar light guide 950 guides the light beams radiated by the light radiation unit 410 to a diffraction region 960 through internal reflection.

The diffraction region 960 may be formed on an inner surface 951 of the planar light guide 950. The diffraction region 960 corresponds to the diffraction region 460 of FIG. 4.

The diffraction region 960 diffracts the light beams guided to the diffraction region 960 and collects the diffracted light beams in an external space 901 located above the inner surface 451. User's pupils 905 may be located in the external space 901.

The range L of the diffraction region 960 may be determined based on a Field Of View (FOV).

The diffraction region 960 may be formed by coating the inner surface 951. Here, a coating material of the diffraction region 960 may be a material which may reflect light. Further, the diffraction region 960 may be formed by partial mirror coating or coating with a material reflecting a specific wavelength band.

The diffraction region 960 may be a coating film. That is, the diffraction region 960 may be formed by attaching a coating film to the inner surface 951.

The diffraction region 960 may include coating areas which are coated, and non-coating areas which are not coated. A periodic pattern having an angle of reflection in a Holographic Optical Element (HOE) type or a Diffractive Optical Element (DOE) type may be formed in the coating areas.

The diffraction region 960 may be at least one of a diffraction region 500 formed in a net structure shown in FIG. 5, a diffraction region 600 formed in a diamond pattern structure shown in FIG. 6, a diffraction region 700 formed in a chessboard structure shown in FIG. 7, and a diffraction region 800 formed in a stripe pattern structure shown in FIG. 8.

For example, the planar light guide 950 includes a first surface disposed opposite the user's pupils 405 (i.e. relatively closer to the user's pupils 405) and a second surface opposite to the first surface (i.e. relatively farther from the user's pupils 405). The diffraction region 960 may be formed on the second surface of the planar light guide 950 and light beams may be radiated from the inside of the substrate to the second surface of the planar light guide 950.

Here, the planar light guide 950 may have a planar surface or a curved surface having curvature.

Here, if the planar light guide 950 has a curved surface, one surface of the planar light guide 950 disposed opposite the user's eyes may be concave.

Figure 10:
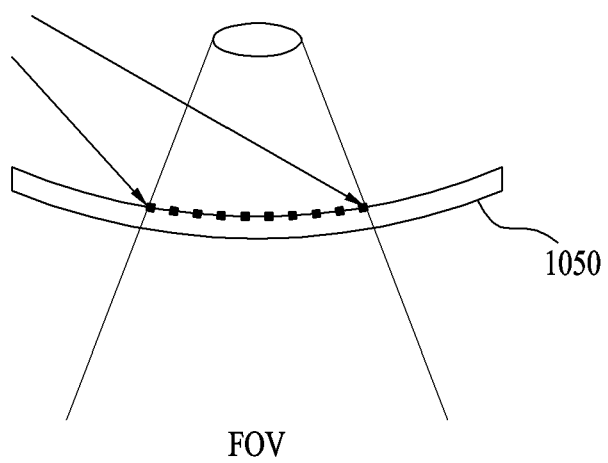
FIG. 10 is a view illustrating the structure of an optical device in accordance with yet another embodiment of the present invention.

FIG. 10 is a view illustrating the structure of an optical device in accordance with yet another embodiment of the present invention.

With reference to FIG. 10, the substrate 450 shown in FIG. 4 may have a surface 1050 having curvature. That is, the substrate 450 may be manufactured so as to have curvature. Thereby, the optical device 400 may be manufactured in an eyeglasses frame structure. That is, the optical device 400 may have an eyeglasses frame structure. Further, a wearable display device in accordance with the present invention may have the eyeglasses frame structure shown in FIG. 10. Therefore, the present invention may manufacture a wearable display which may be worn even by a person wearing glasses or sunglasses.

An optical device and a method for operating the same in accordance with the present invention are not limited to the configurations and methods of the above-described embodiments, and all or some of the embodiments may be selectively combined so that various modifications and variations can be made in the present invention without departing from the spirit or scope of the invention.

Further, it will be apparent to those skilled in the art that various modifications and variations can be made in the present invention without departing from the spirit or scope of the invention. Thus, it is intended that the present invention cover the modifications and variations of this invention provided they come within the scope of the appended claims and their equivalents.

The present invention relates to an optical device which is capable of producing an image in the air. Therefore, the present invention is industrially applicable.

The invention claimed is:

1. An optical device comprising:
 a substrate;
 a reflective diffraction region provided in a net structure on one surface of the substrate; and
 a light radiation unit configured to radiate light beams to the surface of the substrate,
 wherein the diffraction region is configured to diffract light beams incident upon the surface of the substrate and to collect the diffracted light beams within a space spaced from the surface of the substrate,
 wherein the diffraction region includes coating areas which are coated and non-coating areas which are not coated, and
 wherein a size of the non-coating areas of the diffraction region is determined based on at least one of a distance between the substrate and a user's eyes, the size of a user's pupils and the wavelength band of a light source.

2. The optical device according to claim 1, wherein the light radiation unit includes:
   a display source configured to generate light beams to produce an image; and
   a lens unit configured to radiate the generated light beams to the substrate.

3. The optical device according to claim 1, wherein at least a part of the substrate is transparent so as to transmit light therethrough.

4. The optical device according to claim 1, wherein the substrate is opaque so as to block transmission of light therethrough.

5. The optical device according to claim 1, wherein the diffraction region is formed by coating the surface of the substrate or is a coating film provided on the surface of the substrate.

6. The optical device according to claim 1, wherein a coating material of the diffraction region is a material which reflects light.

7. The optical device according to claim 1, wherein the diffraction region is formed by partial mirror coating or coating with a material reflecting a specific wavelength band.

8. The optical device according to claim 1, wherein, in the diffraction region, lattice-type meshes are uniformly formed.

9. The optical device according to claim 8, wherein the net structure includes a web structure, and wherein the meshes correspond to the non-coating areas, and the web corresponds to the coating areas.

10. The optical device according to claim 1, wherein the net structure includes one of a web structure, a diamond pattern structure, a chessboard structure, and a stripe pattern structure.

11. The optical device according to claim 1, wherein a periodic pattern having an angle of reflection in a Holographic Optical Element (HOE) type or a Diffractive Optical Element (DOE) type is formed in the coating areas.

12. The optical device according to claim 1, wherein, in the overall area of the diffraction region, the ratio of the total area of the coating areas to the total area of the non-coating areas is 1:1.

13. The optical device according to claim 1, wherein, in the overall area of the diffraction region, the total area of the coating areas is greater than the total area of the non-coating areas.

14. The optical device according to claim 1, wherein the substrate includes:
   a first surface disposed opposite the user's eyes; and
   a second surface opposite to the first surface, and
   wherein the diffraction region is formed on the first surface of the substrate and the light beams are radiated from the outside of the substrate to the first surface of the substrate.

15. The optical device according to claim 1, wherein the substrate includes:
   a first surface disposed opposite the user's eyes; and
   a second surface opposite to the first surface, wherein the first surface and the second surface form a planar light guide, and
   wherein the diffraction region is formed along the second surface of the substrate and the light beams are radiated from the inside of the substrate to the second surface of the substrate.

16. The optical device according to claim 15, wherein the diffraction region is formed parallel with the planar light guide.

17. The optical device according to claim 1, wherein the substrate has a planar surface.

18. The optical device according to claim 1, wherein the substrate has a curved surface having curvature, and the surface of the substrate disposed opposite a user's eyes is concave.

19. The optical device according to claim 1, wherein the substrate includes at least one of a glass substrate, a plastic substrate and a metal substrate.

20. The optical device according to claim 1, wherein the optical device has an eyeglasses frame structure.

* * * * *